| United States Patent [19] | [11] 4,113,804 |
| --- | --- |
| Cotten et al. | [45] Sep. 12, 1978 |

[54] COMPOSITIONS COMPRISING POLYBUTENE EPDM AND POLYOLEFIN

[75] Inventors: Roger C. Cotten, Metairie, La.; David W. Young, Homewood; Aram Y. Kandanian, Roselle, both of Ill.

[73] Assignee: Southern Chemical Company, Metairie, La.

[21] Appl. No.: 851,764

[22] Filed: Nov. 15, 1977

Related U.S. Application Data

[63] Continuation-in-part of Ser. No. 737,423, Nov. 1, 1976, abandoned.

[51] Int. Cl.$^2$ ............................................. C08L 23/16
[52] U.S. Cl. ........................... 260/897 A; 260/33.2 R; 260/33.6 PQ; 260/33.8 UA
[58] Field of Search ...................................... 260/897 A

[56] References Cited

U.S. PATENT DOCUMENTS

| 3,256,366 | 6/1966 | Corbelli ................................. 260/897 |
| 3,806,558 | 4/1974 | Fischer ............................. 260/897 A |
| 3,957,919 | 5/1976 | Von Bodungen et al. ...... 260/897 A |

*Primary Examiner*—Carman J. Seccuro
*Attorney, Agent, or Firm*—Bernard & Brown

[57] ABSTRACT

Improved compositions containing polybutene-1 especially useful for forming articles such as extruded pipe and film comprise a base butene-1 polymer and thermoplastic elastomer comprising a substantially cured mixture of (1) interpolymer of ethylene, polyene and at least one monoolefin having at least 3 carbon atoms, (2) polyethylene and, preferably, (3) at least one polymer of monoolefin having at least 3 carbon atoms, e.g., polypropylene. The thermoplastic elastomer is present in the compositions in an amount sufficient to enhance the characteristics, such as extrusion or molding characteristics, of the compositions. Also disclosed are adhesives and extrusible and moldable materials embodying the compositions of this invention, and processes for forming the compositions into shaped articles which are solvent weldable to other articles such as pipe or film containing the compositions of this invention.

23 Claims, No Drawings

COMPOSITIONS COMPRISING POLYBUTENE EPDM AND POLYOLEFIN

This is a continuation-in-part of application Ser. No. 737,423, filed Nov. 1, 1976, now abandoned.

The present invention pertains to compositions containing polybutene-1 which exhibit enhanced chemical and physical properties.

Polybutene-1 is widely used for production of flexible pipe. The flexible pipe is generally manufactured by extrusion however, difficulties arise in extruding polybutene-1. A chief problem in extruding polybutene-1 to form articles, e.g., pipes, is due to the slow rate of crystallization of polybutene-1 which may result in the extruded pipes setting in an egg-shaped configuration. This distortion is most evident in extruded pipe of large diameter, e.g., of about 6 to 8 inches, but is also present in smaller diameter pipe such as ½, 1 and 2 inch pipe. In order to avoid the distortion of extruded polybutene-1 articles, e.g., the egging in pipe, it has been proposed to cool the extruded article, however, this procedure is expensive. Another problem in extruding polybutene-1 is the slow fusion time of the polymer which thus requires extrusion equipment providing increased melt time or a reduction in the operating speed of the extruder. Also, when polybutene-1 is extruded, it is susceptible to surging from the extrusion die due to uneven pressures and temperatures in the extruder. The surging produces, for instance, uneven pipe walls. Thus, in smaller as well as larger diameter pipe and films it is difficult to obtain satisfactory products with good production speed from the extruder, and frequently conventional processing equipment such as that used for extruding polyethylene provides unsatisfactory products when employed under conventional conditions. Moreover, the poor processing properties, e.g., extrusion and molding properties, are more readily apparent when the polybutene-1 has been stored for a period of time even under normal storage conditions. A further difficulty is that products made from polybutene-1, e.g., films, have not generally exhibited good heat seal characteristics, for instance, the films cannot readily be welded securely or permanently utilizing present commercial practices.

Von Bodungen and Meredith disclose in U.S. Pat. No. 3,957,919 thermoplastic elastomers formed of EPDM interpolymer, uncross-linked polyethylene and uncross-linked polymer of a monoolefin containing 3 to 16 carbon atoms, preferably polypropylene. Other known elastomers, commonly referred to as TPO materials, contain EPDM terpolymer and one or more polymers of olefinically-unsaturated monomers. For instance, U.S. Pat. No. 3,564,080 discloses vulcanizable, high molecular weight elastomeric compositions containing EPDM-type interpolymer or a copolymer of ethylene and butene-1, amorphous polypropylene and a curing agent. See also Fischer, U.S. Pat. Nos. 3,758,643 and 3,806,558, who discloses EPDM-type interpolymer and olefin polymer-containing compositions.

In accordance with the present invention there are provided polybutene-1 compositions which exhibit enhanced chemical and physical properties and are relatively stable with respect to shrinkage and crystallization upon aging. Advantageously, the polybutene-1 compositions of this invention can be extruded or molded while employing less heat and pressure, and hence with less work, than heretofore required with polybutene-1. The extruded or molded compositions of this invention cool and crystallize sufficiently rapidly after extrusion such that in view of the lower extrusion temperatures which may be employed, distortion such as "egging" of extruded pipe can be substantially avoided and the extruded product may have enhanced conformity and uniformity. Advantageously, mold shrinkage using the compositions of this invention occurs immediately after molding or extruding rather than over an extended period of time. Therefore, an article can be molded and stripped without undue hold time. Furthermore, the compositions of the present invention can quickly be brought to viscosities desirable for extrusion or molding, and, for instance, the extrusion can be conducted substantially without surging which has been characteristic of polybutene-1 extrusion. Accordingly, not only can a larger volume of composition be extruded in a given time, but also conventional extrusion equipment such as that used to extrude polyethylene can be utilized and may even be employed at essentially the same conditions, including extrusion speed, as commonly used in commercial practices for extruding polyethylene. As there is less pressure required to mold or extrude and less heat required to bring to a desired viscosity the compositions of this invention, closer tolerances in finished products can be maintained as compared to products formed from polybutene-1. Moreover, enhanced consistency between batches of polymer for processing into articles can be obtained with the compositions. The compositions of this invention can advantageously be employed in molding operations due to faster cycling time. For instance, a reduction in cycling time of about 30% to 40% may be achieved when molding one-half inch diameter fittings, and the reduction in cycling time can increase as the wall thickness of the molded article, e.g., fittings, increases. Moreover, large molded articles which were essentially impossible to make with polybutene-1 can be fabricated from the compositions of this invention. If desired, roto-molds may be employed since the compositions of this invention can be provided at a suitable viscosity for use in roto-molds.

In making films, processing using the compositions of this invention may be speeded up by approximately 25% compared to the processing of polybutene-1 using conventional film making equipment and typical procedures. The films can be more flexible with no apparent loss in high temperature properties. Thus, thinner films can be produced which have superior tear strength, superior stretch before rupture, and reduced notch sensitivity. The films of the compositions of this invention can be extremely resistant to rupture and have high impact resistance. Furthermore, the films can have good seal characteristics and can be welded securely and permanently using present commercial practices.

The compositions of this invention provide articles, e.g., pipes, films and the like with reduced memory and enhanced flexibility as compared to articles of polybutene-1. Large diameter pipe, for instance, pipe having a diameter of 6, 7, 8 or more inches, made from the compositions can be coiled which saves storage space, whereas pipe of polybutene-1 could only be coiled when the pipe has a diameter of up to about 4 inches. Yet articles molded from the compositions of this invention exhibit good resistance to permanent distortion under mechanical stress, for instance, little or no permanent distortion is observed when a wrench is applied to a fitting. The heat of fusion and solvent weld characteristics of articles of the compositions of this invention are highly advantageous. For instance, the fusion time, i.e., the time required to join pipe sections in the fold using heat, is cut nearly in half using pipes of the compositions of this invention as compared to that using polybutene-1. Also, socket fusion of pipes made from the compositions of this invention can be conducted over a wide temperature range while obtaining satisfactory fusion. The joints tend to be leak free due to the enhanced flow of the compositions thereby reducing voids in the joints.

Articles made from the compositions of this invention, e.g., extruded pipe, can be solvent sealed or welded using the compositions in a suitable solvent or plasticizer as adhesives. The speed of sealing or welding can be greatly increased over that of conventional methods. Moreover, the compositions can be finely-divided and mixed with a solvent or plasticizer to form a putty-like material which can be molded into, e.g., a fitting for a pipe made of the composition. When solvent or plasticizer is applied to one or both of the pipe and fitting, the molded fitting will self-adhere to the pipe as the solvent evaporates.

In accordance with this invention, the compositions are comprised of a substantial amount of polymer of butene-1, i.e., the compositions are generally polybutene-1-based, and an amount sufficient to enhance the physical and chemical characteristics such as extrusion, molding or other working or adhesive characteristics of the compositions, of one or more thermoplastic elastomers comprising a substantially cured, intimate admixture of normally solid polymers which include (1) interpolymer of ethylene, polyene and at least one monoolefin having at least 3 carbon atoms, (2) polyethylene and, preferably (3) at least one polymer of monoolefin having at least 3 carbon atoms, e.g., polypropylene. The thermoplastic elastomer is generally added to the polybutene-1 prior to its extrusion or undergoing another article-forming operation. The thermoplastic elastomer may be present in the compositions in an equal or lesser amount compared to the polybutene-1 component, e.g., about 0.5 or 1 to 50, for example, about 1 or 5 to 30 percent, or about 1 to 10, weight percent. In film compositions the thermoplastic elastomer is preferably about 5 to 20 or 40 percent by weight, while in pipe it is preferably about 5 to 30 or 50 percent. The foregoing amounts are based on the total of the thermoplastic elastomer and polybutene-1 present. In adhesives the ratio of polybutene-1 to the thermoplastic elastomer may also vary considerably, and the latter component may even be present in larger amounts than the polybutene-1. In any event, in adhesives the thermoplastic elastomer is present in an amount which enhances the adhesive qualities of the polybutene-1. The adhesives usually contain one or both of a solvent and plasticizer and the thermoplastic elastomer may serve as a cosolvent for the polybutene-1 and the solvent or plasticizer in the adhesive compositions. In adhesives the amount of the thermoplastic elastomer may, for example, be only about 0.5 or 1 to 5 weight percent, or may be up to about 10 or 20 weight percent or more of the composition.

The elastomeric interpolymers which can be employed in the thermoplastic elastomer used in this invention are conveniently referred to herein as EPDM elastomer, and may be prepared by the interpolymerization of a monomeric mixture of (1) about 10 to 90 percent, preferably about 55 to 85 percent, ethylene based on total weight percent of monoolefin in the interpolymer, (2) about 90 to 10 percent, preferably about 15 to 45 percent, of at least one monoolefin containing at least 3, say, 3 to about 16, carbon atoms, preferably propylene, based on total weight percent of monoolefin in the interpolymer, and (3) sufficient substantially hydrocarbon polyene having adequate carbon-to-carbon unsaturation to provide unsaturation in the interpolymer and enhance cross-linking, e.g., at least about 1 or 2, often up to about 15 or 20, carbon-to-carbon double bonds per 1000 carbon atoms in the interpolymer. Preferably, this amount is about 1 to 5 double bonds per 1000 carbon atoms. The polymerization may be conducted with the monomers in solution using an organic polymerization solvent, and in the presence of Ziegler-type catalyst. Methods for preparing these interpolymers are disclosed in, for instance, U.S. Pat. Nos. 2,933,480; 3,093,620; 3,211,709; 3,113,115; and 3,300,450, herein incorporated by reference.

The monoolefin of 3 or more carbon atoms employed in preparing the interpolymer is preferably an alpha-monoolefin, and often has a straight chain configuration, but branched-chain alpha-monoolefins may also find application. The polyene may have two or more double bonds, and the double bonds may be conjugated such as in butadiene or isoprene, or non-conjugated. The polyene may be open-chain or cyclic, expecially bridged-ring cyclic, and may contain at least 4, preferably at least about 6, carbon atoms up to about 30 or more carbon atoms, preferably up to about 20 carbon atoms. Other examples of polyenes include non-bridged ring monomers such as 1,4-hexadiene, but it is preferred to make use of poly-unsaturated derivatives of cyclic bridged-ring alkanes such as bicyclo-(2,2,1)-heptadiene bridged-ring materials, e.g., dicyclopentadiene, bicyclo-(2,2,1)hepta-2,5-diene, the alkylidene norbornenes, and especially the 5-alkylidene-2-norbornenes wherein the alkylidene group contains 1 to 20 carbon atoms and preferably 1 to 8 carbon atoms, the alkenyl norbornenes, and especially the 5-alkenyl-2-norbornenes wherein the alkenyl group contains about 3 to 20 carbon atoms, and preferably 3 to 10 carbon atoms. Other bridged ring hydrocarbons include polyunsaturated derivatives of bicyclo(2,2,2)-octane as represented by bicyclo(2,2,2)octa-2,5-diene, polyunsaturated derivatives of bicyclo(3,2,1)-octane, polyunsaturated derivatives of bicyclo(3,3,1)-nonane, and polyunsaturated derivatives of bicyclo(3,2,2)-nonane. Frequently, at least one double bond is present in a bridged ring of the bridged-ring polymers, and at least one other double bond is present in a bridged ring or in a side chain. Other examples of bridged ring compounds include 5-methylene-2-norbornene, 5-ethylidene-2-norbornene, 5-isopropylidene-2-norbornene, the methyl butenyl norbornenes such as 5-(2-methyl-2-butenyl)-2-norbornene, or 5-(3-methyl-2-butenyl)-2-norbornene, or 5-(3,5-dimethyl-4-hexenyl)-2-norbornene. The polyene may often comprise about 0.5 to 10 weight percent of the interpolymer.

The interpolymers prepared from ethylene, propylene are polyene are often referred to as EPDM terpolymers or interpolymers. An EPDM interpolymer designated as EPsyn 5509 and having a molecular ratio of ethylene to propylene in the range of 84:16, and an amount of 5-ethylidene-2-norbornene to provide an unsaturation level of about 5 carbon-to-carbon double bonds per 1000 carbon atoms, and its preparation is disclosed in Example VI of U.S. Pat. No. 3,894,999, herein incorporated by reference. An EPDM having an ethylene to propylene mole ratio of 90:10, with an unsaturation level of 2 carbon-to-carbon double bonds per 1000 carbon atoms, derived from the polyene monomer, 5-ethylidene-2-norbornene, is disclosed in Example VII of U.S. Pat. No. 3,894,999. EPDM interpolymer in which the ethylene to propylene mole ratio is 60:50 and the bound 5-ethylidene-2-norbornene is in an amount to provide about 14.5 carbon-to-carbon double bonds per 1000 carbon atoms is disclosed in Example I of U.S. Pat. No. 3,894,999.

The thermoplastic elastomer contains a minor amount of polyethylene which is often at least about 4, e.g., about 4 to 15, weight percent of the thermoplastic elastomer. The polymer of the $C_3+$ monoolefin component and the interpolymer may provide a major portion of the thermoplastic elastomer and may be substantially the remainder, e.g., about 96 to 85 weight percent. Although a $C_3+$ monoolefin polymer may not be present in the thermoplastic elastomer its use is highly desirable, and it may be up to about 90 weight percent, e.g., about 10 to 90 weight percent, based on the total weight of this polymer component and the interpolymer. Thus, the ratio of the polymer of the $C_3+$ monoolefin component to the interpolymer may range widely, for instance, about 10 to 90, preferably about 30 to 70, parts by weight of the interpolymer to about 90 to 10, preferably about 70 to 30, parts by weight of the polymer of monoolefin component.

The polyethylene component of the thermoplastic elastomer can be either a low density polyethylene (e.g., about 0.910–0.925 g/cc), medium density polyethylene (e.g., about 0.926–0.940 g/cc), or high density polyethylene (e.g., about 0.941–0.964 g/cc), whether prepared by a high pressure process or a low pressure process, and including linear polyethylene, and copolymers of ethylene containing about 10 percent or less of copolymerized alpha-olefins having 3 to about 16 carbon atoms. The polymer of $C_3+$ monoolefin component of the thermoplastic elastomer may be comprised of one or more polymers of alpha-olefinic monomers having at least 3, preferably 3 to about 16, carbon atoms. The polymers may be homopolymers or copolymers. A particularly advantageous $C_3+$ monoolefin polymer component is polypropylene. The polypropylene may be a highly crystalline isotactic or syndyotactic polypropylene. Also, the propylene polymer may be a copolymer or a block copolymer containing minor amounts of an alpha-olefin comonomer of 4 to about 16 carbon atoms. Frequently the density of polypropylene is from 0.800–0.980 g/cc. Largely isotactic polypropylene having a density of from about 0.900–0.910 g/cc is preferably employed.

The thermoplastic elastomers for use in the composition of this invention are cured or cross-linked, and this can be accomplished in the presence of a free radical generator to effect cross-linking between at least the EPDM interpolymer and polyethylene and, preferably, with the $C_3+$ monoolefin polymer component. The latter may be blended into the composition after EPDM interpolymer and polyethylene are cross-linked. Various free radical source such as chemical or radiation free radical generators may be used. Advantageously, the thermoplastic elastomer can be prepared in a process in which the interpolymer, polyethylene, with or without a polymer of $C_3+$ monoolefin component are treated, for instance, by working, to effect the desired cross-linking. Working, which is advantageously and most practically done at elevated temperatures, can be carried out as a part of an article-forming operation, such as extrusion, injection molding, compression molding or the like, or it can be carried out as a separate working step, in a mixing device, for instance, a Brabender, hot rolls, Banbury, Baker-Perkins or other hot masticating device having good shearing force. The cross-linking can be carried out as a batch operation by feeding the materials into a Brabender or Banbury or injection molding device, or as a continuous or semi-continuous operation by continuously feeding the materials in the desired ratios onto hot working rolls or into a continuous extrusion machine.

Cross-linking proceeds by free radical reaction which can be promoted by a chemical free radical generator or cross-linking agent. Suitable free radical generators and cross-linking agents include aromatic and aliphatic peroxides such as aromatic diacyl peroxides and aliphatic diacyl peroxides, dibasic acid peroxides, ketone peroxides, alkyl peroxyesters, alkyl hydroperoxides, e.g., diacetylperoxide; dibenzoylperoxide; bis-2,4-dichlorobenzoylperoxide; di-tert-butyl peroxide; dicumylperoxide; tert-butylperbenzoate; tert-butylcumylperoxide; 2,5-bis(tert-butylperoxy)-2,5-dimethylhexane; 2,5-bis(tert-butylperoxy)-2,5-dimethylhexane-3,4,4,4'-tetra(tert-butylperoxy),2,2-dicyclohexylpropane; 4-bis(-tert-butylperoxyisopropyl)-benzene; 1,1-bis(tert-butylperoxy)-3,5,5-trimethylcyclohexane; lauryl peroxide; succinic acid peroxide, cyclohexanone peroxide; tert-butyl peracetate; butyl hydroperoxide, etc. Also suitable are the acid types of curing agents including such materials as the azidoformates (e.g., tetramethylenebis (azidoformate); for others see U.S. Pat. No. 3,284,421, Breslow, November 8, 1965), aromatic polyamides (e.g., 4,4'-diphenylmethane diazide; for others see U.S. Pat. No. 3,297,674, Breslow et al., Jan. 10, 1967), and sulfonazides such as p,p'-oxybis(benzene sulfonyl azide), etc. Also, co-curing agents such as trimethylol propane, trimethacrylate, triallyl-phosphate and divinyl benzene can be employed.

The free radical generator can be provided in minor amounts sufficient to provide the desired cross-linking between the components of the thermoplastic elastomer. The extent of cross-linking effected is generally sufficient to reduce the amount of double bonds in mixture by at least about one double bond per 1000 carbon atoms in the polymers, and often this cross-linking or curing is at least about 80 or 90% complete. Frequently, the chemical free radical generator is in a minor amount, for instance, about 0.01 to 5 weight percent, of the interpolymer. For instance, when dicumyl peroxide is employed, it may be provided in an amount of about 0.05 to 4 weight percent, preferably about 0.1 to 2 weight percent, of the interpolymer. Other free radical generators can be used in corresponding amounts, when calculated on a molecular basis. The time and temperature for maintaining cross-linking conditions is desirably at least about three times the half-life of the catalyst employed, and preferably at least about five to six times the half-life. The minimum cross-linking temperature may be that at which the polyethylene and the $C_3+$ monoolefin polymer, if present, are reduced to a molten state. In general, it is desirable to employ cross-linking temperatures of about 325° to 425° F., preferably about 350° to 370° F. For instance, dicumylperoxide has a half-life of 5 minutes at 300° F., thus 50% of the peroxide will decompose in 5 minutes at such temperature. When the reaction is continued for five to six times the half-life, theoretically about 97% of the peroxide will have been consumed. Under these conditions, the free radical generator is no longer available in amount sufficient to continue the reaction so that the resulting thermoplastic elastomer is not subject to further reaction, and thus remains stable during subsequent molding or re-molding without further cure.

Thermoplastic elastomers which are suitable for use in accordance with this invention are the elastomers known as TPO modifiers. A preferred thermoplastic elastomer is available as CD-101 for Copolymer Rubber & Chemical Corporation of Baton Rouge, Louisiana, and is described in U.S. Pat. No. 3,957,919. Other suitable thermoplastic elastomers include 401T and 402T thermoplastic elastomers of E.I. duPont de Nemours and Co. sold under the trademark Somel, TPR 1910 and TPR 538 available from Uniroyal Chemical, K7820 available from Shell Chemical Co., S13814 available from Hercules, Inc. and CD 33913 available from Exxon. A table of certain physical properties follows as Table No. I. This table is taken from an article by Reismiller and Johnson at the SPE National Technical Conference, November 1974, page 163.

The polybutene-1 and one or more of the thermoplastic elastomers can be conbined into an intimate admixture in any suitable manner. For instance, the blendable thermoplastic elastomer and polybutene-1 can be admixed using procedures which are standard in rubber technology or plastic compounding technology. Suitable mixing equipment includes Banbury mills, Baker-Perkins kneaders, two-roll rubber mills, three roll calenders, and the like. The thermoplastic elastomer and polybutene-1 may be comminuted or otherwise provided in powder form, and the components may be mixed in a hot melt state such as with a compounding extruder. The thermoplastic elastomer and polybutene-1 may be mixed in one operation or in sequential operations, i.e., by the use of master batches. The polybutene-1 and thermoplastic elastomer compositions of this invention may contain fillers, anti-oxidants, plasticizers, flame retardants, pigments, anti-block agents, anti-slip agents, processing aids, colorants and the like. The mixture of polybutene-1 and thermoplastic elastomer may be processed in any suitable manner for forming

TABLE I

| PROPERTY | Uniroyal TPR 1910 | Uniroyal TPR 538 | Shell K7820 | Dupont 3745 | Hercules SB814 | Exxon CD 3398 |
|---|---|---|---|---|---|---|
| Tensile Strength, psi, RT, 20″/min., ASTM D 412 | 1200 | 1000 | 1400 | 1000 | 1600 | 1200 |
| Elongation, %, RT, 20″/min., ASTM D412 | 400 | 350 | 600 | 500 | 400 | 600 |
| Modulus of Stiffness, psi, RT ASTM D747, $X10^{-3}$ | 3.0 | 2.8 | 2.8 | 3.0 | 3.8 | 2.9 |
| Specific Gravity | .89 | .89 | 1.16 | 1.02 | .89 | .90 |
| Flexural Set, Degrees, RT, 10 min. recovery | 22 | 26 | 21 | 22 | 22 | 29 |
| Tear Strength, ASTM D624, Die C, ppi, RT | 450 | 350 | 350 | 400 | 600 | 500 |
| Heat Sag Resistance, Inches droop 250° F. | .42 | .42 | .52 | .53 | .36 | .65 |
| after 1 hr. 275° F. | .42 | .64 | .78 | .83 | .67 | 3.00 |
| Cold Impact, notched dart flex impact, brittle point ° F. | Lower than −40° F. | Lower than −40° F. | 0° F. | −35° F. | Lower than −25° F. | Lower than −40° F. |
| Relative Melt Viscosity at 475° F., Monsanto Capillary Rheometer, 15/1 L/D, Diameter - .0410 inch, Shear Stress - 45 psi | 3.61 | .75 | — | 1.60 | 1.10 | — |

The polymer of butene, i.e., polybutene-1 is a normally solid, crystalline, isotactic, linear polymer having a molecular weight in excess of 100,000. The polymer is generally insoluble in diethyl ether and soluble in orthodichlorobenzene. The polybutene-1, component may be a homopolymer or may be a copolymer or interpolymer with minor amounts, say up to about 5 weight percent or so, of one or more of ethylene, propylene or other alpha-monoolefin, or may be in admixture with one or more polymers such as polyethylene and polypropylene. The polybutene-1, however, comprises a major portion, generally at least about 75 or 90 weight percent, of the polybutene-1-containing component. The polybutene-1 component may be a major amount of the compositions of this invention, say about 50 to 99 or 99.5 weight percent, often about 70 to 95 or 99, or about 90 to 99, weight percent. In film compositions the polybutene-1 component may be about 60 to 95, and preferably is about 80 to 95 weight percent, while in pipes it may be about 50 to 95, and is preferably about 70 to 95, weight percent. In adhesives the amount of the polybutene-1 component may preferably be about 80 or 90, or even 95 to about 99 or 99.5, weight percent. The foregoing amounts are based on the total of the polybutene-1 and thermoplastic elastomer present in the composition.

polybutene-1 based articles, e.g., extrusion, molding, and the like.

In a further aspect of this invention, sections of pipe and sheets of film made from the compositions of this invention can be secured together using an adhesive which contains minor amounts of the polybutene-1 and thermoplastic elastomer components dispersed in a major amount of suitable solvent or plasticizer, i.e., the securing is conducted by liquid welding. Generally, the welding capabilities of the adhesive composition increase as the percentage of thermoplastic elastomer increases. The adhesive compositions of the invention may be comprised of, for instance, about 0.01 to 10 weight percent thermoplastic elastomer, about 0.5 to 20 weight percent polybutene-1, and about 80 to 99.5 percent by weight solvent for the polymers. Suitable relatively volatile solvents include, for example, orthodichlorobenzene, normalamyl benzene, hexane, heptane, diethyl ether, toluene, other chlorinated hydrocarbon solvents such as methylene chloride and di- and trichloroethanes, and mixtures of such solvents. The solvent solution for the adhesive can be prepared in any suitable manner. For instance, the polybutene-1 and thermoplastic elastomer individually, separately or simultaneously, or in preformed fused mixture, can be admixed with the solvent. Elevated temperatures often assist in the dissolving of the polymer, and refluxing conditions may be employed.

Compositions of the inventions may also be formed of the polybutene-1 and thermoplastic elastomer components and a normally liquid plasticizer. Such compositions generally have adhesive qualities and may contain, for example, a minor amount of each of polybutene-1 and thermoplastic elastomer, and a major amount of plasticizer such as a mineral oil of lubricating viscosity. For example, the plasticized compositions may contain about 0.01 to 10 weight percent thermoplastic elastomer, about 0.5 to 20 weight percent polybutene-1, and about 80 to 99.5 weight percent by weight of plasticizer. These compositions may be in plastisol form having the thermoplastic elastomer and polybutene-1 stably dispersed in the plasticizer to form a highly viscous product which is generally flowable at normal temperature.

The adhesive compositions can be used at room temperature and above to coat pipe or film containing a composition of this invention to make a weld. Advantageously, the adhesive composition is agitated before use. The adhesive composition permits welding of plastic articles which contain, for instance, carbon black or other fillers. If desired, prior to welding the surface of the plastic article may be treated with an oxidizing material such as chromic acid to reduce the molecular weight of the polymer composition to improve the weld.

In another aspect of the invention the polybutene-1 and thermoplastic elastomer are finely divided and admixed with a sufficient, and usually a minor, amount of solvent to provide a mixture of putty-like consistency which can be dried. The putty is self-adhering to plastic articles made from the compositions of this invention. Advantageously, the putty can be molded in the shape of a pipe fitting. When applied to a pipe made of the composition of this invention and dried, the fitting becomes self-adherent to the pipe. If desired, the molded fitting can be dried and then solvent welded to a pipe using an adhesive of this invention.

The following examples will serve to illustrate some embodiments of the present invention. In Examples 1 to 27 the polybutene-1 base polymer was a commercial pipe grade resin, and such polymers may typically have the following characteristics: melt index (ASTM D-1238 Cond. E) of 0.4 g./10 min.; density (ASTM D-1505) of 0.915 g./cm$^3$; melting point range of 124 to 126° C.; tensile yield strength (ASTM D-638) of 1900 psi.; tensile break strength (ASTM D-638) of 4200 psi.; tensile elongation (ASTM D-638) of 350%; tensile modulus (ASTM D-638) of 3.5 × 10$^4$ psi; Izod impact strength (ASTM D-256) no break; hardness (ASTM D-2240) of 55 Shore D; brittleness temperature (ASTM D-746) of −18° C.; and environmental stress crack resistance (ASTM D-1693) no failure in 15,000 hours.

EXAMPLE 1-11

In Examples Nos. 1-11 tabulated in Table II, the polybutylene and the elastomer additive were formulated by combining in a mixing extruder as previously described in a manner well-known in the art. The amounts of elastomer were varied between 0 and 40% and various characteristics of the composition were measured. In Examples Nos. 7-11 a filler talc was added by mixing with the other components in the extruder.

The resultig composition is formed into the requied shapes for conventional comparative tests as set forth in Table II and the results of which are shown in Table II.

The ingredients and their amounts are identified for each example in the tabulation of Table II along with the results on the test pieces formed thereof.

The following standard tests were used:

| Tensile strength and elongation | ASTM D 638 |
| Flexural modulus | ASTM D 790 |
| Melt flow rate (Condition L) | ASTM D 1238 |
| Rockwell hardness | ASTM D 785 |
| Izod impact | ASTM D 256 |
| Compression set | ASTM D 412 |
| Tear strength | ASTM D 624 |
| Shore hardness | ASTM D 2240 |

In addition to these tests, the Spiral Flow test which is a method for determining the flow properties of a thermoplastic resin in which the resin flows along the path of a spiral cavity, is utilized. The length of the material which flows into the cavity and its weight gives a relative indication of the flow properties of the resin. The flexural recovery test is also utilized and is reported in the degrees of recovery after 30 seconds and 5 minutes for a 4 by ½ by ⅛ molded specimen which has been bent 90° at room temperature (75°± 2° F.). The Knitline test which provides the unnotched Izod impact strength of a double gated injection molded 4 by ½ by ⅛ specimen at the meeting point of the two melt fronts is also reported.

TABLE II

| Ex. No. | Polybutylene (Wt. %) | CD-101 (Wt. %) | Talc (Wt. %) | Tensile (psi) | Elongation (%) | Spiral Flow (in.) | Melt Flow (g/10 min.) | Flexural Modulus (psi) | Flexural Recovery (deg.) 30"/5" | Rockwell Hardness (R) | Izod Impact ft.-lb/in. (1) | Izod Impact ft.-lb/in. (2) | Knitline (ft.-lb/in.) | Hardness Shore (D) |
|---|---|---|---|---|---|---|---|---|---|---|---|---|---|---|
| 1. | 100 | 0 | 0 | 3950 | 20 | — | 1.16 | 106,000 | 22/21 | 121 | 2.1 | 1.5 | NB | 68 |
| 2. | 95 | 5 | 0 | 3150 | 20 | 10.3 | 1.60 | 82,350 | 31/28 | 106 | 4.1 | 2.8 | 3.0 | 60 |
| 3. | 90 | 10 | 0 | 3325 | 20 | 10.3 | 1.55 | 83,000 | 33/30 | 105 | 5.7 | 4.2 | NB | 60 |
| 4. | 80 | 20 | 0 | 2900 | 20 | 10.1 | 1.63 | 77,200 | 33/29 | 79 | 5.9 | 5.0 | NB | 55 |
| 5. | 70 | 30 | 0 | 3025 | 10 | 10.1 | 1.70 | 70,750 | 26/24 | 67 | 6.5 | 6.1 | NB | 55 |
| 6. | 60 | 40 | 0 | 2300 | 20 | 9.3 | 1.36 | 67,700 | 30/27 | 75 | 7.8 | 6.4 | 8.9 | 50 |
| 7. | 90.4 | 4.8 | 4.8 | 3000 | 20 | 10.2 | 1.67 | 73,100 | 31/29 | 105 | 4.9 | 3.9 | 6.9 | 60 |
| 8. | 95 | 2.5 | 2.5 | 3125 | 20 | 10.1 | 1.68 | 74,600 | 29/26 | 113 | 4.4 | 3.0 | 5.8 | 65 |
| 9. | 80 | 10 | 10 | 2950 | 20 | 9.8 | 1.33 | 92,525 | 30/28 | 107 | 4.5 | 3.4 | 4.1 | 60 |
| 10. | 70 | 15 | 15 | 2750 | 20 | 9.9 | 1.06 | 97,825 | 30/28 | 83 | 3.4 | 3.7 | 3.6 | 60 |
| 11. | 60 | 20 | 20 | 2825 | 20 | 10.1 | 0.81 | 108,350 | 32/29 | 70 | 4.8 | 3.9 | 2.9 | 55 |

(1) Seven (7) days after molding.
(2) Ten (10) weeks after molding.

EXAMPLE 12

The results of a screw injection molding cycle are set out in Table III. This test was run on polybutylene alone and with various amounts of CD-101 elastomer. The various compositions shown in Table III were processed to manufacture an injection molded ring of ⅞ inch diameter, ¼ thickness with a ⅜ inch diameter hole.

The time necessary to completely fabricate this part and allow the injection molder to prepare to fabricate a second part is defined as the cycle time. Shorter cycle times denote more efficient and economical fabrication processes possible with elastomer added to the polybutylene.

TABLE III

| Sample | % Elastomer | Cycle Time (Sec.) |
|---|---|---|
| Polybutylene | 0 | 60 |
| E-116-A | 5 | 45 |
| E-116-B | 10 | 45 |
| E-116-C | 20 | 45 |
| E-116-D | 30 | 45 |
| E-116-E | 40 | 45 |

EXAMPLE 13

Following is Table IV showing extrusion data on the same samples identified in Table III. These data show that blends of polybutylene and CD-101 have less resistance to extrusion at the same pressure than polybutylene alone, and consequently higher extrusion rates can be obtained at a given pressure.

TABLE IV

EXAMPLES 14–25

The following Table V shows a comparison of various mixes of additives with pure polybutylene. Examples 14 to 17 show EPDM mixed with polyethylene, polypropylene and mixtures of the two combined with polybutylene. These materials are satisfactory in producing a flexible tough-to-tear sheet as may be seen by looking at the flexural modulus and notched Izod test results. Also the higher crystallization temperatures and the shorter crystallization times mean that these materials have quick quench tendencies resulting in greater strength.

Examples 18 to 21 are commercial TPO thermoplastic elastomers of polyolefin base and exhibit improved notched Izod characteristics.

Examples 22 to 25 are blends of polybutene-1 (PB) plus EPDM (interpolymer of ethylene, propylene and polyene monomers); polybutene-1 plus polyethylene (PE); polybutene-1 plus polypropylene (PP); and polybutene-1 plus a mixture of polyethylene and polypropylene. The compositions of Examples 22 to 25 do not exhibit as satisfactory notched Izod tests as do the compositions of this invention.

TABLE V

CD-101/PB and Related Laboratory Blend Data[1]

| Ex. No. | Wt. % EPDM | PE | PP | PB | Crystallization Temperature[2] (°C.) | Time[3] (Sec.) | Tensile Strength (psi) | Elongation (%) | Melt Flow Cond. g/10 min. | L Spiral Flow (gms) | Shore D Hardness | Flexural Modulus (psi) | Notched Izod Ft.-lb/in. |
|---|---|---|---|---|---|---|---|---|---|---|---|---|---|
| Polybutylene | — | — | — | 100 | 88° | 11.3 | | | 1.16 | | | | |
| 14. | 12.8 | 2.1 | — | 85.1 | 108° | 8.8 | 4475 | 0 | 1.06 | 8.8 | 55 | 88,000 | 3.4 |
| 15. | 12.2 | — | 6.1 | 81.6 | 104° | 8.2 | 5325 | 0 | 1.30 | 8.6 | 55 | 90,000 | 5.6 |
| 16. | 12 | 2 | 6 | 80 | 109° | 8.2 | 4700 | 0 | 1.50 | 8.8 | 55 | 77,000 | 4.5 |
| 17. | 20% CD-101 Commercial TPO | | | 80 | 114° | 7.9 | 4350 | 0 | 1.52 | 8.8 | 55 | 65,000 | 5.8 |
| 18. | Prolax SB-814 (20%) | | | 80 | | | 4450 | 0 | 1.02 | 8.4 | 64 | 95,600 | 4.8 |
| 19. | TPR 538 (20%) | | | 80 | | | 4450 | 0 | 1.29 | 9.0 | 57 | 88,375 | 4.4 |
| 20. | Somel 402-T (20%) | | | 80 | | | 3975 | 0 | 0.97 | 8.6 | 60 | 94,375 | 5.0 |
| 21. | Somel 301G (20%) | | | 80 | | | 5000 | 0 | 1.19 | 8.7 | 60 | 108,150 | 2.4 |
| 22. | 13 | — | — | 87 | 88° | | | | | | | | 1.8 |
| 23. | — | — | 6.9 | 93.1 | 107° | | | | | | | | 1.4 |
| 24. | — | 2.4 | — | 97.6 | 105° | | | | | | | | 1.6 |
| 25. | — | 2.3 | 6.8 | 90.1 | 106° | | | | | | | | 1.4 |

[1] The test results are ASTM tests.
[2] The crystallization temperatures were obtained from DTA cooling experiments at a cooling rate of 25° per minute.
[3] The crystallization times were obtained from extruded melt strands passing through a filled water trough where the cooling rate was of the order of hundreds of degrees per minute.

Brabender Extrosion Data With a ⅛ × ½ Inch Die Orifice at 475° F.

| Sample | RPM | Pressure (psi) | Extrusion Rate (g/min.) | Shear Rate (Sec.⁻¹) | Shear Stress (psi) | Torque (M-g) |
|---|---|---|---|---|---|---|
| Polybutylene | 30 | 350 | 17.0 | 99 | 45.2 | 2250–2500 |
| | 40 | 380 | 21.0 | 120 | 49.0 | 2500–3000 |
| | 50 | 410 | 23.8 | 136 | 52.9 | 2750 |
| | 60 | 430 | 27.6 | 157 | 55.5 | 2500–3000 |
| | 70 | 450 | 31.6 | 183 | 58.1 | 2750 |
| | 80 | 470 | 35.0 | 198 | 60.6 | 2750 |
| | 90 | 480 | 39.8 | 230 | 61.9 | 2750 |
| E-116A | 30 | 270 | 14.1 | 84 | 34.8 | 1150 |
| | 50 | 300 | 22.5 | 131 | 38.7 | 1400 |
| | 70 | 340 | 31.0 | 177 | 43.9 | 1650 |
| | 90 | 390 | 39.6 | 230 | 50.3 | 1850 |
| E-116B | 30 | 260 | 13.6 | 78 | 33.5 | 1050 |
| | 50 | 310 | 22.0 | 125 | 40.0 | 1250 |
| | 70 | 350 | 30.2 | 172 | 45.2 | 1600 |
| | 90 | 400 | 39.1 | 224 | 51.6 | 1700 |
| E116C | 30 | 260 | 13.2 | 78 | 33.5 | 950 |
| | 50 | 300 | 22.0 | 125 | 38.7 | 1250 |
| | 70 | 350 | 29.4 | 172 | 45.2 | 1450 |
| | 90 | 400 | 37.6 | 219 | 51.6 | 1550 |

EXAMPLE 26

To prepare a specific adhesive, 10 grams of a plastic blend is formulated from a 10% by weight CD-101 and 90% polybutylene. To this is added 90 grams of a mixed solvent which is 50% orthodichloro benzene and 50% by weight normal amyl benzene. About 18 hours is required to reflux this system so that the polymer blend is solvated.

This solvent solution of polymer can be used at room temperature or above to coat plastic pipe or film to make a solvent weld, however, the adhesive should be agitated before use. The pipe or film can have carbon black or other fillers incorporated therein and still be solvent welded with the adhesive composition of this invention.

EXAMPLE 27

To prepare a putty-like molding composition, a mixture of 80 parts by weight polybutene-1 and 20 parts CD-101 are milled into a fine powder of less than about 100 mesh. To this is added 30 parts by weight solvent which is a mixture of 50% orthodichlorobenzene and 50% normal amyl benzene. This mixture is made into a putty-like consistency and molded into a fitting. This fitting is removed from the mold and applied to a pipe fabricated from a composition of this invention. The fitting will self-adhere to the pipe as the solvent evaporates.

It is claimed:

1. A composition of matter comprising polybutene-1 as base polymer and an amount sufficient to enhance the working or adhesive characteristics of the composition of a crosslinked, thermoplastic elastomer comprising an EPDM interpolymer elastomer of ethylene, polyene and monoolefin having 3 to about 16 carbon atoms; and a minor amount of polyethylene; with or without normally solid polymer of monoolefin having 3 to about 16 carbon atoms.

2. A composition of claim 1 wherein normally solid polymer of monoolefin of 3 to about 16 carbon atoms is present in the composition which is cross-linked to provide said thermoplastic elastomer, and wherein the ratio of polymer of monoolefin of 3 to about 16 carbon atoms to interpolymer is about 10 to 90 parts by weight of the interpolymer to about 90 to 10 parts by weight of the polymer of monoolefin.

3. A composition of claim 2 wherein said normally solid polymer of monoolefin comprises polypropylene.

4. A composition of claim 3 wherein the thermoplastic elastomer comprises about 1 to 30 weight percent of the composition.

5. A composition of claim 3 wherein said polypropylene comprises crystalline polypropylene.

6. A composition of claim 1 wherein said cross-linking is conducted by free radical reaction during working at elevated temperature.

7. A composition of matter comprising about 50 to 99% polybutylene-1 as base polymer and about 1 to 50% of a freeradical, cross-linked, thermoplastic elastomer comprising an EPDM interpolymer elastomer of ethylene, polyene and propylene, and about 4 to 15% of polyethylene, and polypropylene, wherein the ratio of polypropylene to interpolymer is about 10 to 90 parts by weight of the interpolymer to about 90 to 10 parts by weight of polypropylene, and wherein said cross-linked product is formed during working of the composition at elevated temperature.

8. A composition of claim 7 wherein said polyene is diene of about 6 to 20 carbon atoms.

9. A composition of claim 8 wherein said polymer of monoolefin comprises crystalline polypropylene.

10. A composition of claim 9 wherein the ratio of polypropylene to interpolymer is about 15 to 40 parts by weight of polypropylene and about 60 to 85 parts by weight of interpolymer.

11. A composition of claim 10 wherein the thermoplastic elastomer comprises about 1 to 30 weight percent of the composition.

12. A plastic pipe comprised of a composition of claim 1.

13. A plastic pipe comprised of a composition of claim 2.

14. A plastic pipe comprised of a composition of claim 10.

15. A film comprised of a composition of claim 1.

16. A film comprised of a composition of claim 2.

17. A film comprised of a composition of claim 10.

18. An adhesive composition comprised of a minor amount of a composition of claim 1, and solvent or plasticizer.

19. An adhesive composition comprised of a minor amount of a composition of claim 2, and solvent or plasticizer.

20. An adhesive composition comprised of a minor amount of a composition of claim 10, and solvent or plasticizer.

21. A composition comprising a finely-divided composition of claim 1, and a small, effective amount of solvent sufficient to form said composition into putty-like consistency suitable for molding.

22. A composition comprising a finely-divided composition of claim 2, and a small, effective amount of solvent sufficient to form said composition into putty-like consistency suitable for molding.

23. A composition comprising a finely-divided composition of claim 10, and a small, effective amount of solvent sufficient to form said composition into putty-like consistency suitable for molding.

* * * * *